United States Patent Office 3,682,802
Patented Aug. 8, 1972

3,682,802
METHOD FOR GRAFTING ON POLYESTER FIBERS WITH RADIATION
Ichiro Sakurada, Sakyo-ku, Kyoto-shi, and Toshio Okada, Moriguchi-shi, Osaka-fu, Japan, assignors to Japan Atomic Energy Research Institute, Tokyo, Japan
No Drawing. Filed Sept. 4, 1968, Ser. No. 757,475
Claims priority, application Japan, Sept. 6, 1967, 42/57,160; Dec. 2, 1967, 42/77,316
The portion of the term of the patent subsequent to Mar. 14, 1989, has been disclaimed
Int. Cl. B01j 1/00; C08d 9/10; C08g 39/10
U.S. Cl. 204—159.15
9 Claims

ABSTRACT OF THE DISCLOSURE

A method of graft copolymerizing acrylic acid or methacrylic acid onto polyester fiber by irradiation with ionizing radiation, comprising the addition of pyridine, 2-vinylpyridine, or 4-vinylpyridine to the reaction system to increase the rate and the effectiveness of the graft copolymerization.

SUMMARY OF THE INVENTION

This invention relates to a novel method for graft copolymerizing onto polyester fibers. In particular, the invention is directed to a novel method for grafting a polymerizable unsaturated organic acid onto polyester fibers by irradiation with an ionizing radiation which is characterized by adding pyridine, 2-vinylpyridine, or 4-vinylpyridine to said polymerizable unsaturated organic acid, such as acrylic acid or methacrylic acid.

A hydrophobic synthetic fiber, such as polyester or polyolefin fiber, has the drawbacks that the fiber is difficult to dye, has a poor hygroscopicity and is liable to accumulate electric charge. The method which comprises graft copolymerizing a hydrophilic monomer onto said fiber is well known as one solution to overcome the mentioned shortcomings. Acrylic acid or methacrylic acid are, for example, broadly used for that purpose. These are inexpensive monomers which impart hygroscopicity, antistatic property and dyeability, especially for basic dyes, to said fibers. However, since acrylic acid and methacrylic acid have high rates of polymerization and tend to homopolymerize, their use lowers both the grafting yield, i.e. the fraction of monomer used for the intended grafting, and the grafting efficiency. In addition, the use of acrylic acid or methacrylic acid has the further drawback that the resulting homopolymers frequently gel and that their separation from the product to be obtained, is difficult. When said monomers are grafted onto polyester in fiber-form, the fibers tend to adhere to each other. To separate the fibers, rinsing with a large quantity of a solvent is required. However, when the adherence occurs at the same time as the gelling of homopolymers, even rinsing will not be sufficient for the intended separation of the fibers. These factors present the difficulties inherent in the process mentioned above.

To overcome these difficulties, a number of studies were made and some solutions have been suggested. For example, Japanese patent, No. 19,836/66 claims "In the method for grafting an unsaturated organic acid onto polyester polymer comprising irradiating said polymer with an ionizing radiation and contacting said polymer with said acid or a solution thereof, the improvement which is characterized by adding a retarder, such as a metal or a metal salt, to the reaction system, said retarder preventing only the homopolymerization of said unsaturated organic acid, and adding further thereto an acid stronger than said organic unsaturated acid." Another Japanese patent, No. 14,472/67, claims "In the method for grafting an unsaturated organic acid onto polyester polymer by irradiating said polymer with an ionizing radiation, the improvement which is characterized by adding a retarder, such as a metal or a metal salt, to the reaction system, said retarder preventing only the homopolymerization of said unsaturated organic acid, and adding further thereto an amount not more than 10%, preferably 0.05–3%, on the basis of the volume of said unsaturated organic acid or the solution thereof, of a benzenoid nuclear substitution compound having the general formula

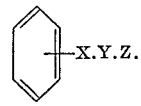

wherein X, Y or Z represent a substituent selected from the group of hydrogen, alkyl, halogen, amino, amido, nitro, ester, phenyl and the substituted radicals thereof, respectively, the number of said substituents being not more than three." However, these methods do not always have satisfactory results.

Therefore, it is an object of this invention to provide a method for readily grafting acrylic acid or methacrylic acid onto polyester fiber without affecting the behavior and the properties of the fiber.

Another object of this invention is to provide a method for increasing the reaction rate of the graft copolymerization.

Yet another object is to provide a method of graft copolymerization for preventing the homopolymerization of acrylic acid and methacrylic acid without any addition of a retarder for said homopolymerization and obtaining a grafted polyester fiber in a desirable state without occurrence of any adherence between the fibers.

Still another object is to provide a method of graft copolymerization whereby the reactant fiber is not deteriorated. Other objects of this invention will be apparent from the description hereinafter.

The above-mentioned objects of this invention are accomplished by a method which comprises irradiating a polyester fiber with an ionizing radiation and contacting the fiber with acrylic acid, methacrylic acid, or a solution thereof, whereby pyridine, 2-vinylpyridine or 4-vinylpyridine is previously added to the reaction system.

In the case of graft copolymerizing acrylic acid or methacrylic acid onto a polyester fiber by the pre-irradiation method or the simultaneous irradiation method with an ionizing radiation, it was found that when pyridine, 2-vinylpyridine, or 4-vinylpyridine is previously added to acrylic acid or methacrylic acid, the graft copolymerization proceeds more rapidly than in the case without addition of pyridine or its derivatives. The homopolymerization of said monomer is prevented without any addition of a particular retarder for said homopolymerization, and the grafted polyester fiber is obtained in a desirable state without the fibers clinging to each other. According to this method, the graft copolymerization proceeds in the reaction system having a higher pH value of 3.0–4.3 than 2.2–2.5 in the case without pyridine and, the deterioration of the fiber in the course of copolymerization can be prevented. Moreover, especially when the graft copolymerization proceeds with addition of 4-vinylpyridine, it was found that the resulting fiber has a fairly good dyeability for acid dyes, as contrasted with the starting fiber which has no dyeability or the resulting fiber from the grafting in the presence of acrylic acid alone or methacrylic acid.

The application of the method of this invention is not limited to polyester in the form of fibers. It can be polyester in the form of various articles, such as filament, tow, sliver, yarn, woven and knitted fabrics and nonwoven fabrics.

In practicing the present invention, any well-known ionizing radiation effective for graft copolymerization, i.e. corpuscular rays as well as electromagnetic waves, such as neutrons, X-rays, or $\alpha$, $\beta$, or $\delta$-$\gamma$-rays, may be used. Electron beams and $\gamma$-$\delta$-rays are especially suitable. The pre-irradiation method as well as the simultaneous irradiation method is operable with these rays. And, the exposure dose to be required depends on the desired grafting yield and the conditions of the grafting reaction because the grafting yield is ruled by the exposure dose. Suitable exposure doses exist between $10^6$ and $10^7$ röntgens in the case of pre-irradiation, and between $10^3$ and $10^7$ röntgens in the case of simultaneous irradiation.

In the method of this invention, the operable amount of pyridine, 2-vinylpyridine, or 4-vinylpyridine to be added to the copolymerizing system is in the range of 5-50 parts to 100 parts of acrylic acid or methacrylic acid parts being by volume. Preferably, 10-30 parts of pyridine or 5-20 parts of 2- or 4-vinylpyridine on said basis are added. As to the medium, a solution with an organic solvent, such as methanol or ethanol, an aqueous dispersion, or an emulsion admixed with a suitable surfactant may be used. Particularly, when used for copolymerization the result will be very satisfactory with an emulsion where the concentration of acrylic acid or methacrylic acid is between 2 and 10%, the concentration of the surfactant is maintained below 1%, and 5-50% of pyridine, 2-vinylpyridine or 4-vinylpyridine are added, calculated on the volume of said monomer. The amount of the by-product homopolymer is extremely low and the obtained fibers scarcely adhere to each other. Thus, this product has an advantage in that the removal of homopolymer by rinsing can be omitted. The method of this application can be effectively applied both to methacrylic acid, and to acrylic acid.

In the simultaneous irradiation technique, the method of this invention can be equally applied in the presence or absence of air. However, the removal of air or the replacement by nitrogen has the advantage of decreasing the exposure dose to obtain the same grafting yield. The operable temperature at which the irradiation proceeds is between 10° and 100° C., preferably between 40° and 60° C. In the pre-irradiation technique, the presence or absence of air during the graft copolymerization has no relation to the effect of this invention. However, the exposure dose or the period of time for the polymerization can be diminished to obtain the same grafting yield, when the pre-irradiation was operated in the absence of air, which may either be removed or replaced by nitrogen. In that case, the temperature at which the polymerization proceeds is preferably between 40° and 100° C.

When the reaction mixture is to be used as an aqueous dispersion, the graft copolymerization can proceed in an aqueous solution of acrylic acid or methacrylic acid, in which 2-vinylpyridine or 4-vinylpyridine has been suspended by means of agitation etc. However, it is preferred that an emulsion be formed by adding 0.1-1.0% by volume of a suitable nonionic surfactant (e.g. polyoxyethylene-sorbitan monolaurate, sorbitan monolaurate, or the like) or a cationic surfactant (e.g. stearyltrimethylammonium chloride, cetylpyridinium chloride, or the like).

The grafted polyester fiber having a grafting yield of more than 2-3% obtained according to the method of this invention can be dyed with a basic dye, such as crystal violet, in the same degree as cotton fiber; in comparison, the starting polyester fiber has no dyeability by this color. The grafted polyester fiber has the advantage of being dyed to a deep color with a dispersed dye, e.g. Kayalon Fast Brown, whereas the starting fiber is only dyed to medium color. Besides, in the case of 4-vinylpyridine being added to the reaction mixture for the graft copolymerization, it has been found that the grafted polyester fiber obtained can be dyed with an acid dye, e.g. Brilliant Scarlet 3R, to a light shade, whereas the starting fiber is scarcely colored at all. It can also be observed that the hygroscopicity of the resulting fiber is enhanced over that of the starting fiber.

The following examples are intended to illustrate the invention, but they should not be interpreted as limiting its scope.

EXAMPLE 1

After polyethylene terephthalate fiber (10 denier x 18) had been washed with cold water for 24 hours and dried, 100 mg. of the fiber were charged into a test tube having an outer diameter of 1 cm.; to this were added, 5 cc. of one of the aqueous acrylic acid solutions having the composition shown in Table 1 (containing 0.5% of polyoxyethylene-sorbitan monolaurate). The test tube was deaired and sealed off. Then the tube was heated to 50° C. and irradiated with the $\gamma$-ray from cobalt 60 (dose rate of $1.1 \times 10^4$ röntgens/hour) at the exposure dose of $2.2 \times 10^4$ röntgens. Thereafter, the fiber was removed from the test tube, rinsed with water, dried, and weighed. The resulting weight gain percent is regarded herein as the grafting yield. The appearance of the fiber between irradiating and rinsing, the amount of the homopolymer formed, and the grafting yield are shown in Table 1.

TABLE 1

| Composition of copolymerizing system [1] (volume ratio) | | | Parts of pyridine per 100 parts of acrylic acid | Grafting yield, percent | Amount of homopolymer formed [2] | Adherence |
| --- | --- | --- | --- | --- | --- | --- |
| Acrylic acid | Pyridine | Water | | | | |
| 10 | 0 | 90 | 0 | 0 | Fairly viscous liquid | Scarcely adhering. |
| 9 | 1 | 90 | 12.2 | 6.8 | Almost nil | No adhering. |
| 8 | 2 | 90 | 25.0 | 4.8 | ___do___ | No adherence. |
| 7 | 3 | 90 | 42.8 | 2.0 | ___do___ | Do. |
| 6 | 4 | 90 | 66.7 | 0 | ___do___ | Do. |

[1] 0.5% of polyoxyethylenesorbitan monolaurate was added to the reaction mixture. In all following examples, the same concentration of the same emulsifier was used.

[2] The amount of homopolymer by-product was estimated from the appearance of the reaction mixture after the irradiation and the precipitate obtained by pouring the mixture into benzene.

As can be seen from Table 1, when 12, 25 and 42% of pyridine on the basis of the volume of acrylic acid are added to acrylic acid, the rate of graft copolymerization appreciably increases compared to the test without pyridine, no homopolymer is formed as by-product, and there is no adherence between fibers.

EXAMPLE 2

Example 1 was repeated except that the exposure dose was $6.6 \times 10^4$ röntgens. The results are shown in Table 2.

TABLE 2

| Composition of copolymerizing system (volume ratio) | | | Parts of pyridine per 100 parts of acrylic acid | Grafting yield, percent | Amount of homopolymer formed | Adherence |
| --- | --- | --- | --- | --- | --- | --- |
| Acrylic acid | Pyridine | Water | | | | |
| 10 | 0 | 90 | 0 | 6.7 | Viscous liquid | Adhering. |
| 9 | 1 | 90 | 12.2 | 11.6 | Almost nil | No adhering. |
| 8 | 2 | 90 | 25.0 | 11.2 | ___do___ | No adherence. |
| 7 | 3 | 90 | 42.8 | 5.3 | ___do___ | Do. |
| 6 | 4 | 90 | 66.7 | 2.0 | ___do___ | Do. |

EXAMPLE 3

The same starting polyethylene terephthalate fiber as in Example 1 was used. By means of simultaneous irradiation, the fiber was irradiated at the exposure dose of $6.6 \times 10^4$ röntgens in the pressure of air of the air. Other operating conditions for the graft copolymerization were the same as in Example 1. The results of the runs are shown in Table 3.

TABLE 3

| Composition of copolymerizing system (volume ratio) | | | Parts of pyridine per 100 parts of acrylic acid | Grafting yield, percent | Amount of homopolymer formed | Adherence |
| --- | --- | --- | --- | --- | --- | --- |
| Acrylic acid | Pyridine | Water | | | | |
| 10 | 0 | 90 | 0 | 1.9 | Fairly viscous liquid | Adherence. |
| 9 | 1 | 90 | 12.2 | 7.6 | Almost nil | No adherence. |
| 8 | 2 | 90 | 25.0 | 5.5 | ___do___ | Do. |
| 7 | 3 | 90 | 42.8 | 4.2 | ___do___ | Do. |

EXAMPLE 4

Example 3 was repeated except that the exposure dose was $2.6 \times 10^5$ röntgens. The results are shown in Table 4.

TABLE 4

| Composition of copolymerizing system (volume ratio) | | | Parts of pyridine per 100 parts of acrylic acid | Grafting yield, percent | Amount of homopolymer formed | Adherence |
| --- | --- | --- | --- | --- | --- | --- |
| Acrylic acid | Pyridine | Water | | | | |
| 10 | 0 | 90 | 0 | 6.6 | Large, gelation | Extremely adhering. |
| 9 | 1 | 90 | 12.2 | 19.5 | Somewhat viscous liquid | Somewhat adherence. |
| 8 | 2 | 90 | 25.0 | 14.4 | Scarcely formed | No adherence. |
| 7 | 3 | 90 | 42.8 | 6.6 | ___do___ | No adhering. |

EXAMPLE 5

After about 100 mg. of the same polyethylene terephthalate fiber as in Example 1 had been irradiated in air with γ-rays from cobalt 60 (dose rate of $1.3 \times 10^5$ röntgens/hour) at the exposure of $1.0 \times 10^6$ röntgens, the fiber was charged into a test tube having an outer diameter of 1 cm. 5 cc. of a mixture which is composed of acrylic acid, pyridine and water in the ratio of 9:1:90 and which contains 0.5% of an emulsifier was added to the test tube. The whole system was heated at 50° C. for 24 hours. After heating, it was found that the amount of homopolymer formed was small and there was scarcely any adherence among fibers. The grafting yield of 7.9% was formed after rinsing with cold water and drying. This result is in contrast to the result from the following run.

Another run was made with the same procedure as in the run mentioned above except that 5 cc. of an aqueous solution containing 10% of acrylic acid and 0.5% of an emulsifier were used in place of the above-mentioned mixture containing pyridine mentioned above. In the latter run, a large quantity of homopolymer was formed and the resulting mixture was extremely viscous. When removed from the mixture the fibers adhered to each other to a considerable extent. The homopolymer adhering to the fiber could be removed only by rinsing with hot water. The grafting yield was 3.4%.

EXAMPLE 6

After about 100 mg. of the same polyethylene terephthalate fiber as in Example 1 had been charged into a test tube having the outer diameter of 1 cm., 5 cc. of one of methacrylic acid aqueous solutions of the compositions shown in Table 5 (containing 0.5% of an emulsifier) were added thereto. The test tube was deaired and sealed off. Then the tube was irradiated with γ-rays from cobalt 60 (dose rate of $1.1 \times 10^4$ röntgens/hour) at the exposure dose of $2.2 \times 10^4$ röntgens. After the reaction, the resulting fiber was removed from the tube. The fiber was rinsed with ethanol, dried and weighed. The weight percent gain is regarded as the grafting yield. The results of the runs are shown in Table 5.

TABLE 5

| Composition of copolymerizing system (volume ratio) | | | Parts of pyridine per 100 parts of methacrylic acid | Grafting yield, percent | Amount of homopolymer formed | Adherence |
| --- | --- | --- | --- | --- | --- | --- |
| acrylic acid | Pyridine | Water | | | | |
| 10 | 0 | 90 | 0 | 3.6 | Large, blocky gel | Remarkably adhering. |
| 9 | 1 | 90 | 12.2 | 17.7 | Large, gelation, precipitation. | Adhering. |
| 8 | 2 | 90 | 25.0 | 16.2 | Medium | Scarcely adhering. |
| 7 | 3 | 90 | 42.8 | 7.3 | Scarcely formed | Do. |
| 6 | 4 | 90 | 66.7 | 2.0 | ___do___ | Do. |

EXAMPLE 7

Example 1 was repeated except that pyridine in Example 1 was replaced by 2-vinylpyridine. The results of graft copolymerizing acrylic acid into polyester fiber are shown in Table 6.

TABLE 6

| Amount of 2-vinylpyridine used [1] (cc.) | Parts of 2-vinylpyridine per 100 parts of acrylic acid (percent) | Grafting yield (percent) | Amount of homopolymer formed and the appearance of liquid phase | Adherence of fiber |
|---|---|---|---|---|
| 0 | 0 | 1.7 | Small, viscous liquid | Scarcely adhering. |
| 0.1 | 10 | 4.0 | Almost nil, clear solution | No adherence. |
| 0.2 | 20 | 2.6 | do | Do. |
| 0.4 | 40 | 2.4 | do | Do. |
| 0.6 | 60 | 1.9 | do | Do. |
| 0.8 | 80 | 2.2 | do | Do. |
| 1.0 | 100 | 2.1 | do | Do. |

[1] The amount of 2-vinylpyridine used per 10 cc. of 10% aqueous acrylic acid solution (containing 0.5% of polyoxyethylenesorbitan monolaurate on the basis of the reaction mixture).

EXAMPLE 8

Example 7 was repeated except that the exposure dose was $6.6 \times 10^4$ röntgens instead of $2.2 \times 10^4$ röntgens. The results of the graft copolymerization are shown in Table 7.

TABLE 7

| Amount of 2-vinylpyridine used (cc.) | Parts of 2-vinylpyridine per 100 parts of acrylic acid (percent) | Grafting yield (percent) | Amount of homopolymer formed and the appearance of liquid phase | Adherence of fiber |
|---|---|---|---|---|
| 0 | 0 | 6.7 | Large, fairly viscous liquid | Adherence. |
| 0.1 | 10 | 13.2 | Almost nil, clear solution | No adherence. |
| 0.2 | 20 | 8.2 | do | Do. |
| 0.4 | 40 | 4.7 | do | Do. |
| 0.6 | 60 | 2.5 | do | Do. |
| 0.8 | 80 | 3.1 | do | Do. |
| 1.0 | 100 | 2.9 | do | Do. |

EXAMPLE 9

The same polyethylene terephthalate fiber as in Example 7 was used. Example 7 was repeated except that 4-vinylpyridine was used instead of 2-vinylpyridine. The results of graft copolymerization are shown in Table 8.

TABLE 8

| Amount of 4-vinylpyridine used (cc.) | Parts of 4-vinylpyridine per 100 parts of acrylic acid (percent) | Grafting yield (percent) | Amount of homopolymer formed and the appearance of liquid phase | Adherence of fiber |
|---|---|---|---|---|
| 0 | 0 | 1.7 | Small, viscous liquid | Adherence. |
| 0.1 | 10 | 15.9 | Almost nil, clear solution | No adherence. |
| 0.2 | 20 | 10.0 | do | Do. |
| 0.4 | 40 | 3.8 | do | Do. |
| 0.6 | 60 | 1.9 | do | Do. |
| 0.8 | 80 | 0.8 | do | Do. |
| 1.0 | 100 | 0.4 | do | Do. |

EXAMPLE 10

Example 9 was repeated except that the exposure dose was $6.6 \times 10^4$ röntgens instead of $2.2 \times 10^4$ röntgens. The results of grafting acrylic acid are shown in Table 9.

TABLE 9

| Amount of 4-vinylpyridine used (cc.) | Parts of 4-vinylpyridine per 100 parts of acrylic acid (percent) | Grafting yield (percent) | Amount of homopolymer formed and the appearance of liquid phase | Adherence of fiber |
|---|---|---|---|---|
| 0 | 0 | 6.7 | Large, fairly viscous liquid | Remarkably adhering. |
| 0.1 | 10 | 23.5 | Almost nil, clear solution | Adherence. |
| 0.2 | 20 | 193.0 | do | Do. |
| 0.4 | 40 | 14.7 | do | No adherence. |
| 0.6 | 60 | 7.6 | do | Do. |
| 0.8 | 80 | 3.5 | do | Do. |
| 1.0 | 100 | 1.4 | do | Do. |

EXAMPLE 11

After about 100 mg. of the same polyethylene terephthalate fiber as in Example 1 had been charged into a test tube having the outer diameter of 1 cm. 5 cc. of any one of aqueous methacrylic acid solutions of the composition shown in Table 10 were added thereto. The air in the test tube was replaced with nitrogen by passing the same for 2 minutes, and then the tube was sealed off. The tube was irradiated with γ-rays from cobalt 60 (dose rate of $1.1 \times 10^4$ röntgens/hour) at the exposure dose of $2.2 \times 10^4$ röntgens. After the reaction, the resulting fiber was removed from the test tube, rinsed with ethanol, dried and weighed. The thus treated fiber had the properties shown in Table 10.

TABLE 10

| Amount of 2-vinyl pyridine used [1] (cc.) | Parts of 2-vinyl pyridine per 100 parts of methacrylic acid | Grafting yield (percent) | Amount of homopolymer formed and the appearance of liquid phase | Adherence of fiber |
|---|---|---|---|---|
| 0 | 0 | 3.2 | Large, clear viscous solution | Adhering. |
| 0.1 | 10 | 11.8 | Large, formed as white precipitate | Scarcely adhering. |
| 0.2 | 20 | 5.8 | Medium, formed as white precipitate | No adherence. |
| 0.4 | 40 | 3.2 | Small, clear solution | Do. |
| 0.6 | 60 | 2.5 | A little, pale yellow solution | Do. |
| 0.8 | 80 | 2.3 | Almost nil, yellow solution | Do. |
| 1.0 | 100 | 2.0 | ...do | Do. |

[1] The amount of 2-vinylpyridine used per 10 cc. of 10% aqueous methacrylic acid solution (containing 0.5% of polyoxyethylenesorbitan monolaurate on the basis of the reaction mixture).

As can be seen from Table 10, when 20–40 parts of 2-vinylpyridine per 100 parts of methacrylic acid were used, the formation of by-product homopolymer was very small and the grafted fiber was obtained without mutual adherence. When 10 parts of 2-vinylpyridine were used, it was ascertained that the rate of graft copolymerization remarkably increased though a slight adherence was caused.

EXAMPLE 12

Example 11 was repeated except that the exposure dose was $6.6 \times 10^4$ röntgens instead of $2.2 \times 10^4$ röntgens. The results of graft copolymerization are shown in Table 11.

TABLE 11

| Amount of 2-vinyl pyridine used (cc.) | Parts of 2-vinyl-pyridine per 100 parts of methacrylic acid (percent) | Grafting yield (percent) | Amount of homopolymer formed and the appearance of liquid phase | Adherence of fiber |
|---|---|---|---|---|
| 0 | 0 | 6.3 | Large, blocky gel | Remarkably adhering. |
| 0.1 | 10 | 21.2 | Large, formed as white precipitate | Adhering. |
| 0.2 | 20 | 21.4 | ...do | No adherence. |
| 0.4 | 40 | 9.3 | Small, formed as white precipitate | Do. |
| 0.6 | 60 | 4.2 | Small, pale yellow solution | Do. |
| 0.8 | 80 | 2.8 | Almost nil, yellow solution | Do. |
| 1.0 | 100 | 2.3 | ...do | Do. |

EXAMPLE 13

The same polyethylene terephthalate fiber as in Example 1 was used. Example 11 was repeated except that 4-vinylpyridine was used instead of 2-vinylpyridine. The results of graft copolymerization are shown in Table 12.

TABLE 12

| Amount of 4-vinylpyridine used (cc.) | Parts of 4-vinylpyridine per 100 parts of methacrylic acid (percent) | Grafting yield (percent) | Amount of homopolymer formed and the appearance of liquid phase | Adherence of fiber |
|---|---|---|---|---|
| 0 | 0 | 3.8 | Large, clear gel | Adherence. |
| 0.1 | 10 | 24.7 | Large, formed as white precipitate | Do. |
| 0.2 | 20 | 22.8 | Small, formed as white precipitate | Scarcely adhering. |
| 0.4 | 40 | 13.9 | Small, clear solution | No adherence. |
| 0.6 | 60 | 7.9 | Scarcely formed, clear solution | Do. |
| 0.8 | 80 | 3.9 | Almost nil, clear solution | Do. |
| 1.0 | 100 | 1.8 | ...do | Do. |

EXAMPLE 14

Example 12 was repeated except that the exposure dose was $6.6 \times 10^4$ röntgens instead of $2.2 \times 10^4$ röntgens. The results of graft copolymerization are shown in Table 13.

EXAMPLE 15

About 100 mg. of the same polyethylene terephthalate fiber as in Example 1 was irridated in the air at the room temperature with the electron beam of 1.5 m.e.v., 100 μA. from a Van de Graaff accelerator at the absorbed dose of 6.0 Mrad. Thereafter, said fiber was charged into a test tube having the outer diameter of 1 cm., and 5 cc. of one of the aqueous methacrylic acid solutions having the compositions shown in Table 14 (containing 0.5% of polyoxyethylenesorbitan monolaurate as emulsifier) were added thereto. The air in the test tube was replaced with nitrogen by passing the same for 2 minutes, and then the tube was sealed off. Thereafter, the tube was heated at 50° C. for 3.5 hours. Table 14 represents the states of liquid phase after copolymerization, the extent of homopolymer formation, and the grafting yield calculated from the increase in weight of the fiber after extracting and removing methacrylic acid homopolymer.

TABLE 13

| Amount of 4-vinylpyridine used (cc.) | Parts of 4-vinylpyridine per 100 parts of methacrylic acid (percent) | Grafting yield (percent) | Amount of homopolymer formed and the appearance of liquid phase | Adherence of fiber |
|---|---|---|---|---|
| 0 | 0 | 7.4 | Large, clear gel | Remarkably adhering. |
| 0.1 | 10 | 34.2 | Large, formed as white precipitate | Adhering. |
| 0.2 | 20 | 52.2 | ...do | Do. |
| 0.4 | 40 | 24.2 | Medium, formed as white precipitate | Scarcely adhering. |
| 0.6 | 60 | 21.6 | Scarcely fromed, formed as white precipitate | No adherence. |
| 0.8 | 80 | 13.7 | Almost nil, clear solution | Do. |
| 1.0 | 100 | 6.2 | ...do | Do. |

TABLE 14

| Amount of 2-vinyl pyridine used (cc.) | Parts of 2-vinyl-pyridine per 100 parts of methacrylic acid (percent) | Grafting yield (percent) | Amount of homopolymer formed and the appearance of liquid phase | Adherence of fiber |
|---|---|---|---|---|
| 0 | 0 | 3.6 | Small, clear viscous solution | Adherence. |
| 0.1 | 10 | 19.3 | Almost nil, clear solution | No adherence. |
| 0.2 | 20 | 8.4 | ___do___ | Do. |
| 0.4 | 40 | 2.5 | ___do___ | Do. |
| 0.6 | 60 | 2.6 | ___do___ | Do. |

Although the present invention has been described with respect to specific details of certain embodiments thereof, it is not intended that such details serve as limitations of the scope and spirit of the present invention.

What is claimed is:

1. In a method for graft copolymerizing polyethylene terephthalate fibers with an organic base and an unsaturated polymerizable organic acid, wherein the fibers are contacted with said organic base and said organic acid, the improvement which comprises that the organic base is selected from the group consisting of pyridine, 2-vinylpyridine and 4-vinylpyridine, and said organic acid is selected from the group consisting of acrylic acid and methacrylic acid, and the resulting system is irradiated with ionizing radiation at an exposure dose of about $10^3$–$10^6$ rad., the volume ratio of organic base to polymerizable unsaturated organic acid being between about 5:95 and 40:60.

2. The improvement of claim 1 wherein the ionizing radiation is selected from the group consisting of gamma rays and electron beams.

3. The improvement of claim 1 wherein said polymerizable unsaturated organic acid is in the form of an aqueous emulsion containing about 2 to 10% of said acid.

4. The improvement of claim 1 wherein said polymerizable unsaturated organic acid is in the form of an aqueous solution containing about 2 to 10% of said acid.

5. The improvement of claim 1 wherein the irradiation is carried out at about 40°–100° C.

6. In a method for graft copolymerizing polyethylene terephthalate fibers, wherein said fibers are pre-irradiated with ionizing radiation at an exposure dose of about $10^6$–$10^7$ rad. and the resulting pre-irradiated fibers are contacted with a mixture of an organic base and a polymerizable unsaturated organic acid, the improvement which comprises that said organic base is selected from the group consisting of pyridine, 2-vinylpyridine and 4-vinylpyridine and said organic acid is selected from the group consisting of acrylic acid and methacrylic acid, the volume ratio of organic base to polymerizable unsaturated organic acid being between about 5:95 and 40:60.

7. The improvement of claim 6 wherein said polymerizable unsaturated organic acid is in the form of an aqueous emulsion containing about 2 to 10% of said acid.

8. The improvement of claim 6 wherein said polymerizable unsaturated organic acid is in the form of an aqueous solution containing about 2 to 10% of said acid.

9. The improvement of claim 6 wherein the mixture of pre-irradiated fiber, organic base, and unsaturated organic acid is heated to about 40°–100° C.

References Cited
UNITED STATES PATENTS 3,274,294    9/1966    Stanton et al.    260—873
3,088,791    5/1963    Cline et al.    204—159.17

MURRAY TILLMAN, Primary Examiner

R. B. TURER, Assistant Examiner

U.S. Cl. X.R.

260—873